United States Patent
Takanashi et al.

[11] Patent Number: 5,916,687
[45] Date of Patent: Jun. 29, 1999

[54] FILM-FORMABLE EMULSION TYPE SILICONE COMPOSITION FOR AIR BAG AND AIR BAG

[75] Inventors: Masanori Takanashi; Makoto Matsumoto, both of Tokyo, Japan

[73] Assignee: Toshiba Silicone Co., Ltd., Tokyo, Japan

[21] Appl. No.: 08/899,314

[22] Filed: Jul. 30, 1997

[30] Foreign Application Priority Data

Jul. 30, 1996 [JP] Japan ..................................... 8-200115

[51] Int. Cl.$^6$ ................... B32B 9/04; C08K 9/06
[52] U.S. Cl. ................... 428/447; 523/209; 524/837; 280/728.1
[58] Field of Search ................... 523/209; 280/728.1; 524/837; 428/447

[56] References Cited

U.S. PATENT DOCUMENTS

| | | | |
|---|---|---|---|
| 5,188,899 | 2/1993 | Matsumoto et al. | 428/405 |
| 5,218,014 | 6/1993 | Matsumoto et al. | 523/209 |
| 5,312,860 | 5/1994 | Mize et al. | 524/493 |

FOREIGN PATENT DOCUMENTS

| | | |
|---|---|---|
| 0 433 727 A1 | 6/1991 | European Pat. Off. |
| 0 552 983 A2 | 7/1993 | European Pat. Off. |
| 0 702 106 A1 | 3/1996 | European Pat. Off. |

*Primary Examiner*—Robert Dawson
*Assistant Examiner*—Caixia Lu-Rutt
*Attorney, Agent, or Firm*—Sughrue, Mion, Zinn, Macpeak & Seas, PLLC

[57] ABSTRACT

A film-formable emulsion type silicone composition for an air bag, which comprises the respective amounts of colloidal silica-silicone core shell material comprising 80% to 5% by weight of a core comprising colloidal silica (A)(a) and 20% to 95% by weight of a shell comprising a particular polyorganosiloxane containing an ethylenically unsaturated group (b), a particular polyorganohydrogensiloxane (B), a curing catalyst (C), an emulsifying agent (D), and water (E), is disclosed. The composition can form an elastomeric substance having excellent adhesive properties to air bag base cloth, gas tightness, and mechanical strength on an air bag base cloth by removing water therefrom.

5 Claims, No Drawings

FILM-FORMABLE EMULSION TYPE SILICONE COMPOSITION FOR AIR BAG AND AIR BAG

FIELD OF THE INVENTION

The present invention relates to a film-formable emulsion type silicone composition for an air bag which can be adjusted to viscosities suitable for the respective coating methods without using any toxic organic solvents and with safety for the environment and human body, excellent in coating properties, good in adhesion to air bag base cloth and gas tightness, and can form a rubber cured film reduced in feeling of tackiness of the surface; and an air bag prepared by sewing sheets of air bag base cloth on which the cured film is formed of said film-formable emulsion type silicone composition.

BACKGROUND OF THE INVENTION

In recent years, a so-called air bag device is in wide use as a safeguard provided in front of an automobile seat. The air bag device is made up of an air bag in a sack state, a sensor perceiving a shock which is administered to an automobile, and an inflator in which a gas is introduced into the air bag by action of the sensor to blow it up in a moment. The air bag is normally folded and contained, for example, within the steering wheel. When an automobile receives a strong shock, for example, by a crash, the sensor located in the center of the dashboard floor or front floor perceives the shock which allows reaction of a gas-generating agent such as sodium azide contained as a main component in the inflator to evolve a nitrogen gas that is sent to the air bag to inflate it in a moment. That is, the air bag device perceives a shock on occurrence of a motor vehicle accident to inflate the air bag in a moment and the inflated air bag effectively mitigates the impact on riders, thus playing a major role in protecting the riders from the accident. In general, the base cloth for air bags of such air bag devices is woven cloth formed of synthetic resins such as nylon resin, on one side of which (the side forming the inside of the air bag) chloroprene rubber films (JP-A-49-55028; The term "JP-A" as used herein means an "unexamined published Japanese patent application) or silicone rubber films (JP-A-2-270654) are formed, and the air bags are prepared by sewing in a sack state several sheets of such base cloth which are cut to specified shapes, respectively. The films formed on the inside of the air bags present gas tightness to the woven cloth, and in addition, prevent the nylon woven cloth from being directly exposed to a gas of high temperatures which is introduced into the air bags in a burst once the air bags are unfolded to prevent the nylon resin from fusion and deterioration, which in turn prevent riders from exposure to the gas of high temperatures. Therefore, some resistance to heat is required for the films. On the other hand, as air bags must be normally folded and contained, for example, within the steering wheel, the air bags which can be folded as compactly as possible are desirable in view of space saving for containment. From this viewpoint, chloroprene rubber was mainly used for the above-mentioned films at first. However, the chloroprene rubber has the disadvantages of insufficient thermal resistance and insufficient durability which lead to shortened life of the air bag. In addition, to prevent the danger of fire and blast which may break out on crashing, it is necessary for air bags to have fire retardance. The chloroprene rubber is so insufficient in fire retardance that fire retardants made of silicone must be further applied to regions of chloroprene rubber films which are exposed to the blast.

On the other hand, in air bags coated with silicone rubber, it is possible to give fire retardance to coated films themselves by incorporating known fire retardants into the silicone rubber, thus to exclude an additional step of applying the fire retardants to base cloth. For this reason, considerable attention has been directed to silicone rubber coating agents providing more excellent resistance to heat and weather than the chloroprene rubber.

The air bags coated with the silicone rubber also are usually contained in the steering wheel and blown up by the blast on crashing. Then the coated films also instantly stretch corresponding to stretching of the base cloth, and therefore, mechanical strength and stretching properties are required for the silicone rubber films. Consequently, base polymers of high polymerization degrees and high viscosities are utilized and further blended with reinforcing agents, fire retardants, adhesives, and the like. However, it is difficult that these silicone compositions which are highly viscous in general are applied to base cloth in desired amounts of 30 to 100 $g/m^2$ by a coating method such as knife coating. Accordingly, the compositions need a stage of diluting with organic solvents such as toluene or xylene to be adjusted to viscosities so that coating such as knife coating is readily carried out and curing coated films, while evaporating the solvents in a drier.

Therefore, it is difficult, in general, to apply the rubber for air bags to base cloth in usually required amounts of 30 to 100 $g/m^2$ by a coating method such as knife, roll, or gravure coating and it is commonly performed that the rubber is diluted with organic solvents to be adjusted to viscosities suitable for coating prior to coating.

However, these organic solvents have the disadvantages of possibly catching fire due to static electricity, health hazard caused by inhalation or touch to skin, and in addition, a heavy cost is required to recover evaporated solvents. The organic solvents further introduce the problem of air pollution when they are not recovered. Use of the organic solvents is coming to be regulated in all areas in recent years.

To attain low viscosities suitable for applying coating compositions to base cloth through knife coating or the like without using the organic solvents, there is a method of lowering polymerization degrees of base polymers of the coating compositions. However, such compositions fail to form cured films with sufficient mechanical strength when applied to the base cloth. When air bags are unfolded, the films may craze by blast of high temperatures, failing to sufficiently blow up the air bags because of gas leaks.

In addition, conventional rubber coating compositions have the disadvantage of forming cured films with great tackiness to cause blocking of the films to one another.

On the other hand, a variety of silicone aqueous emulsion compositions which form elastomeric substances after removal of water have been proposed for film-formable emulsion type silicone compositions. Examples of such compositions proposed include those composed of a polydiorganosiloxane blocked by hydroxyl groups at both the ends of the molecular chain, a polyorganohydrogensiloxane, a polyalkyl silicate, and a tin salt of fatty acid as described in JP-B-38-860 (The term "JP-B" as used herein means an "examined Japanese patent publication"); those composed of a polydiorganosiloxane blocked by hydroxyl groups at both ends of the molecular chain, a silane containing three or more functional groups, and a tin salt of fatty acid as described in JP-B-57-57063; those composed of a polydiorganosiloxane, a polyorganohydrogensiloxane, and a platinum compound as described in JP-B-58-17226; and emulsion polymerization products from a cyclic organosiloxane and a functional group-bonded organoalkoxysilane as described in JP-A-54-131661.

However, although elastomeric substances formed of these emulsion compositions are excellent in thermal resistance, water repellency, weathering resistance, and transparency, they are inferior in mechanical strength, which indicates that they are unsuitable, for example, as coating agents.

Some means of adding colloidal silica as a reinforcing agent have been proposed to improve the mechanical strength. One of such means utilizes hydrosilylation. For example, it is described in JP-A-54-52160 to add colloidal silica to an emulsion composed of a polydiorganosiloxane containing a vinyl group in the ends of the molecular chain or in side chains, a polyorganohydrogensiloxane, and a platinum compound (catalyst). In addition, JP-A-56-36546 discloses a process for adding colloidal silica in which an emulsion composed of a polydiorganosiloxane blocked by vinyl groups at both the ends of the molecular chain, a polyorganohydrogensiloxane, and a platinum compound (catalyst) is heated to form a crosslinking structure and colloidal silica is then added to the emulsion.

However, elastomeric substances formed by removal of water from these emulsion compositions have only insufficient bonding, namely interfacial adhesion, between colloidal silica and the polyorganosiloxanes and uniform dispersability of colloidal silica also is poor, failing to sufficiently offer the reinforcing effect of silica on silicones.

To resolve the problem described above, as crosslinking processes different from those described above, JP-A-61-16929 and JP-A-61-271352 disclose processes for preparing emulsions in which, for example, a diorg-anosiloxane of a low polymerization degree which is blocked by hydroxyl groups at both the ends of the molecule and an alkoxysilane containing three or more functional groups undergo emulsion polymerization in the presence of an acidic colloidal silica. However, it is difficult to contain a starting siloxane and the colloidal silica in the same micelle in initial homogenizing, and in the emulsion thus formed, unreacted siloxane and silica coexist with condensation products between them in the micelle, failing to achieve improvement in the mechanical strength.

SUMMARY OF THE INVENTION

One object of the present invention is to provide film-formable emulsion type silicone compositions for air bags which contain colloidal silica-silicone core shell products as a main component, and after removal of water, can form elastomeric substances excellent in mechanical characteristics, adhesion to air bag base cloth, and gas tightness without using toxic organic solvents.

Another object of the present invention is to provide air bags in which such cured films are formed.

As a result of intensive studies to achieve the above-mentioned objects, the present inventors have found that use of film-formable emulsions which contain particular colloidal silica-silicone core shell products as a main component offer the advantages of forming films excellent in adhesion to a variety of air bag base cloth, gas tightness, and mechanical characteristics and of being adjusted to viscosities suitable for the respective coating methods such as knife, roll, or gravure coating without using toxic organic solvents and forming rubber surfaces corresponding to irregularities of base cloth surfaces to reduce a feeling of tackiness on the rubber surfaces, which improves working efficiency in sewing air bags or prevents the rubber surfaces from blocking caused by contact with one another, thus accomplishing the present invention.

That is, the present invention provides a film-formable emulsion type silicone composition for air bags, which comprise:

(A) 100 parts by weight of a colloidal silica-silicone core shell material comprising:
  (a) 80% to 5% by weight of cores comprising a colloidal silica, and
  (b) 20% to 95% by weight of shells comprising a polyorganosiloxane represented by the following average compositional formula:

$$R^1{}_a SiO_{(4-a)/2} \tag{I}$$

wherein $R^1$'s each represent a substituted or unsubstituted monovalent hydrocarbon group having 1 to 8 carbon atoms, and a is a number of 1.80 to 2.20, provided that from 0.01 to 25 mol % of $R^1$ is a group containing an ethylenically unsaturated group, (B) a polyorganohydrogensiloxane having per molecule at least two units represented by the following general formula:

$$R^2{}_b H_c SiO_{[4-(b+c)]/2} \tag{II}$$

wherein $R^2$'s may be the same or different and each represent a substituted or unsubstituted monovalent hydrocarbon group having no ethylenically unsaturated group, b represents an integer of 0 to 2, c an integer of 1 or 2, and b+c is an integer of 1 to 3, the amount of the polyorganohydrogensiloxane being such that the number of the hydrogen atoms bonded to the silicon atoms per ethylenically unsaturated group in component (A) is 0.01 to 100, (C) $1 \times 10^{-6}$ to 1 part by weight of a curing catalyst, (D) 1 to 20 parts by weight of an emulsifying agent, and (E) 50 to 1000 parts water by weight.

The present invention also provides air bags prepared by sewing an air bag base cloth having formed thereon a cured film of the emulsion type silicone composition.

The colloidal silica-silicone core shell material herein means a material mainly comprising colloidal silica particles used as a core which are at least partly covered with a silicone. The material may contain a small amount of separated silicone particles and other particles.

The emulsion type silicone composition according to the present invention can be prepared in the following manner.

That is, a mixture of (A)(a) colloidal silica, (b-1) a polyorganosiloxane which has structural units represented by the following general formula, and has 2 to 10 silicon atoms but has no hydroxyl group:

$$R^3{}_n SiO_{(4-n)/2} \tag{III}$$

wherein $R^3$ represents a substituted or unsubstituted monovalent hydrocarbon group having 1 to 18 carbon atoms and containing no ethylenically unsaturated group; and n is an integer of 0 to 3, (b-2) an ethylenically unsaturated group-containing polyorganosiloxane having structural units represented by the following general formula, which has 2 to 10 silicon atoms but no hydroxyl group:

$$R^4{}_l R^5{}_m SiO_{(4-l-m)/2} \tag{IV}$$

wherein $R^4$ represents a substituted or unsubstituted monovalent hydrocarbon group having 1 to 18 carbon atoms and no ethylenically unsaturated group; $R^5$ represents a substituted or unsubstituted monovalent hydrocarbon group having 1 to 8 carbon atoms and an ethylenically unsaturated group; and l represents an integer of 1 to 2; m an integer of 1 to 3; and l+m is an integer of 1 to 3, and if necessary, (b-3) a silane compound having 1 to 4 alkoxy groups, or a mixture of (a), (b-2), and if necessary, (b-3) is subjected to emulsion polycondensation in the presence of an emulsifying agent to prepare an aqueous emulsion of a colloidal silica-silicone core shell material. Subsequently, the polyorganohydrogensiloxane (B) having units represented by general formula (II) and a curing catalyst of component (C) are added to the aqueous emulsion prepared above and then mixed to obtain an emulsion type silicone composition of the present invention. The addition of the polyorganohydrogensiloxane (B) to the emulsion is performed as it is or as an aqueous emulsion prepared by mechanically emulsifying the same in the presence of an emulsifying agent according to conventional procedure.

The silicone aqueous emulsion compositions according to the present invention contain as the main component a core/shell material comprising colloidal silica cores each covered with a silicone shell through siloxane bonds. Due to this structure, the reinforcing properties of the colloidal silica can be exhibited sufficiently and effectively. Cured elastomers which are finally obtained by evaporating volatile components such as water at room temperature or with heating exhibit excellent mechanical strength.

DETAILED DESCRIPTION OF THE INVENTION

The components forming silicone aqueous emulsion compositions according to the present invention will be explained below.

The colloidal silica-silicone core shell material of component (A) used in the present invention is the main component which forms cured elastomers after removal of water. This core shell material comprises colloidal silica particles of component (a) covered with polyorganosiloxanes of component (b). In more detail, a simpler system of such a core shell material includes the following three forms; (1) a form in which both the ends of a polyorganosiloxane are bonded to a silica surface through siloxane bonds, (2) a form in which one end of the polyorganosiloxane is bonded to a silica surface through a siloxane bond and the other end thereof is blocked with a hydroxyl group, and (3) a form in which both ends of the polyorganosiloxane are blocked with hydroxyl groups and no siloxane bond to a silica surface is formed. Concurrent use of a tri- or tetrafunctional alkoxysilane or a chain stopper increases the number of these forms to complicate their structure.

The amount of polyorganosiloxanes of component (b) constituting shell portions in the colloidal silica-silicone core shell material of component (A) is in the range of 20% to 95% by weight. The amount not reaching 20% by weight markedly lowers elastic modulus to form cured films lacking in elastomeric characteristics. On the other hand, exceeding 95% by weight fails to sufficiently present reinforcing properties of colloidal silica to polyorganosiloxanes to form cured elastomers lacking in mechanical strength.

Organic groups bonded to the silicon atoms of polyorganosiloxanes of component (b) in the core shell material of component. (A) are substituted or unsubstituted monovalent hydrocarbon groups each having 1 to 8 carbon atoms. Groups containing ethylenically unsaturated groups form 0.01 to 25 mol % of the organic groups.

Examples of the unsubstituted hydrocarbon groups containing no ethylenically unsaturated groups include straight-chain or branched alkyl groups such as methyl, ethyl, propyl, hexyl, octyl, decyl, hexadecyl, or octadecyl; aryl groups such as phenyl, naphthyl, or xenyl; aralkyl groups such as benzyl, β-phenylethyl, methylbenzyl, or naphthylmethyl; and cycloalkyl groups such as cyclohexyl, or cyclopentyl.

Examples of the substituted hydrocarbon groups containing no ethylenically unsaturated groups further include groups in which hydrogen atoms of the unsubstituted organic groups exemplified above are substituted by halogen atoms such as fluorine or chlorine. Specific examples thereof include 3,3,3-trifluoropropyl and 3-fluoropropyl.

Examples of the ethylenically unsaturated groups include groups represented by the following general formulae:

(V)

(VI)

(VII)

Examples of the group containing an ethylenically unsaturated group include a group represented by the following general formula:

(VIII)

In formulae (V) to (VIII) above, n represents an integer of 0 to 10.

Examples of the groups containing an ethylenically unsaturated group represented by formula (V) include vinyloxypropyl, vinyloxyethoxypropyl, vinyloxyethyl, and vinyloxyethoxyethyl. Of these, vinyloxypropyl and vinyloxyethoxypropyl are preferred.

Where the ethylenically unsaturated group is represented by the formula (VI) above, $R^6$ is a hydrogen atom or an alkyl group having 1 to 6 carbon atoms, preferably a hydrogen atom or an alkyl group having 1 or 2 carbon atoms, and more preferably a hydrogen atom or a methyl group. Examples of groups containing such ethylenically unsaturated groups represented by formula (VI) include vinylphenyl, 1-(vinylphenyl)ethyl, 2-(vinylphenyl)ethyl, (vinylphenyl)-methyl, isopropenylphenyl group, 2-(vinylphenoxy)ethyl, 3-(vinylbenzoyloxy)propyl, and 3-(isopropenylbenzoylamino)-propyl. Of these, vinylphenyl, 1-(vinylphenyl)ethyl, and 2-(vinylphenyl)ethyl are preferred.

Where the ethylenically unsaturated group is represented by the formula (VII) above, $R^7$ is a hydrogen atom or a methyl group. $R^8$ represents an alkylene group having 1 to 6 carbon atoms, —O—, —S—, or —N($R^9$)—$R^{10}$—, wherein $R^9$ is an hydrocarbon group having 1 to 6 carbon atoms, an acryloyl group, or a methacryloyl group; and $R^{10}$ is an alkylene group having 1 to 6 carbon atoms. Examples of the groups containing the ethylenically unsaturated group represented by the formula (VII) include γ-acryloxypropyl group, γ-methacryloxypropyl, N-methacryloyl-N-methyl-γ-aminopropyl, N-acryloyl-N-methyl-γ-aminopropyl, and N,N-bis (methacryloyl)-γ-aminopropyl. Of these, N-methacryloyl-N-methyl-γ-aminopropyl and N-acryloyl-N-methyl-γ-aminopropyl are preferred.

Examples of the group containing the ethylenically unsaturated group represented by the formula (VIII) above include vinyl, allyl, homoallyl, 5-hexenyl, and 7-octenyl. Vinyl and allyl are preferred.

The content of these groups containing such carbofunctional groups and ethylenically unsaturated groups is generally from 0.01 to 25 mol %, and preferably 0.05 to 5 mol %, based on the total amount of $R^1$ in the average compositional formula (I).

$$R^1{}_a SiO_{(4-a)/2} \qquad (I)$$

These ethylenically unsaturated groups form crosslinking sites in which the hydrogen atoms directly bonded to the silicon atoms of component (B) undergo hydrosilylation by-theiaction of a curing catalyst (C). The amount not reaching 0.01 mol % results in lowering mechanical strength of cured films, whereas exceeding 25 mol % causes cured films to become hard and fragile.

Other monovalent organic groups of component (A)(b) include organic functional groups composed of carbon atoms, hydrogen atoms, and at least one kind of atom selected from a nitrogen atom and an oxygen atom. The emulsion composition in which component (b) containing such organic functional groups is used for preparing component (A) exhibits excellent adhesive properties (adhesion or fixing) on coating air bag base cloth.

Examples of such organic functional groups are shown below.

— $CH_2CH_2CH_2NH_2$

— $CH_2CH_2CH_2NHCH_2CH_2NH_2$

— $CH_2CH_2CH_2NHCH_2CH_2NHCH_2CH_2NH_2$

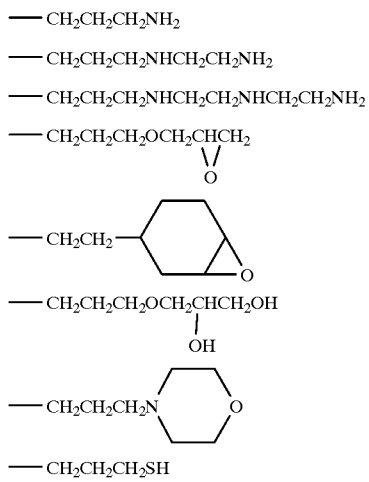

— $CH_2CH_2CH_2SH$

Molecular structure of the polyorganosiloxane of component (A)(b) preferably is of substantially straight-chain structure. The substantially straight-chain structure means involving slightly branched-chain structure. The groups containing the ethylenically unsaturated groups may be located at the ends of molecular chains or at any sites in molecular chains. Where the ethylenically saturated groups are not located at the ends of molecular chains, it is preferred that the ends of molecular chains are blocked by a hydroxyl group, an alkoxy group, a trimethylsilyl group, a dimethylphenylsilyl group, or a 3,3,3-trifluoropropyldimethylsilyl group.

Component (B) used in the present invention is a polyorganohydrogensiloxane containing at least two units each of which is represented by the general formula:

$$R^2{}_b H_c SiO_{[4-(b+c)]/2} \qquad (II)$$

wherein $R^2$, b, and c are the same as defined above. The silicon-bonded hydrogen atoms function as a crosslinking agent in hydrosilylation of component (B) with the ethylenically unsaturated groups of component (A).

Molecular structure of component (B) is not particularly limited as long as component (B) has per molecule 2 or more hydrogen atoms directly bonded to silicon atoms. Although a polyorganohydrogensiloxane having straight-chain, cyclic, or branched structure can be used, those of the straight-chain structure and those composed of $R^2{}_2HSiO_{1/2}$ units and $SiO_2$ units are preferred because of easiness of preparation thereof.

$R^2$'s in the molecule may be the same or different and each represent a substituted or unsubstituted monovalent hydrocarbon residue having no ethylenically unsaturated bond. Examples of such a hydrocarbon group include alkyl groups such as methyl, ethyl, propyl, butyl, hexyl, octyl, decyl, and dodecyl; cycloalkyl groups such as cyclohexyl; aryl groups such as phenyl; and substituted monovalent hydrocarbon groups such as chloromethyl, 3,3,3-trifluoropropyl, and chlorophenyl. Of these, methyl is preferred in view of easiness of preparation thereof.

In siloxane units other than units represented by formula (II) of component (B), organic groups bonded to silicon atoms may be the same or different and include groups similar to $R^2$. Methyl is preferred in view of easiness of preparation thereof.

Component (B) is used in an amount such that the number of the hydrogen atoms bonded to the silicon atoms is 0.01 to 100, and preferably 0.1 to 10, per one ethylenically unsaturated group of component (A). When the number of the hydrogen atoms does not reach 0.01, cured films obtained are lacking in the number of crosslinking, resulting in lowering mechanical strength. On the other hand, when the number exceeds 100, physical properties (particularly thermal resistance) of cured films obtained remarkably change.

The curing catalyst of component (C) promotes the addition reaction of the hydrogen atoms bonded to the silicon atoms of component (B) to the ethylenically unsaturated groups of component (A). Although the curing catalysts include cobalt-, rhodium-, nickel-, palladium-, and platinum-based compounds and are not particularly limited, the platinum-based compounds are preferred. Examples of the platinum-based compounds include chloroplatinic acid, solutions of chloroplatinic acid in alcohols or ketones and aged solutions thereof, complex compounds between chloroplatinic acid and olefins, complex compounds between chloroplatinic acid and alkenylsiloxanes, complex compounds between chloroplatinic acid and diketones, platinum black, and platinum supported on carriers.

The amount of the curing catalysts of component (C) is from $1\times10^{-6}$ to 1 part by weight in terms of metals constituting the curing catalysts per 100 parts by weight of the colloidal silica-silicone core shell material of component (A). The amount not reaching $1\times10^{-6}$ part by weight fails to sufficiently promote the crosslinking reaction, whereas exceeding 1 part by weight fails to offer the effect suitable to amounts used, producing an uneconomical result.

The emulsifying agent of component (D) has the function of stabilizing the colloidal silica-silicone core shell material of component (A) in water, and simultaneously acts as a polycondensation catalyst in preparation of the core shell material of component (A). Anionic and cationic emulsifying agents are used as the emulsifying agent.

The anionic emulsifying agents include organic sulfonic acid-series emulsifying agents such as aliphatic group-substituted benzenesulfonic acids, aliphatic group-substituted naphthalenesulfonic acids, aliphatic sulfonic acids, silylalkyl sulfonic acids, and aliphatic group-substituted diphenyl ether sulfonic acids, in which aliphatic substituent groups contain 6 to 18 carbon atoms. Of these, the aliphatic group-substituted benzenesulfonic acids are preferred. Although these emulsifying agents are used in the form of free sulfonic acids in the preparation of the colloidal silica-silicone core shell material, they are present as salts in the composition of the present invention, because the emulsifying agent is thereafter neutralized with alkalis.

The cationic emulsifying agents are of a quaternary ammonium salt type, which includes alkyltrimethylammonium salts such as octadecyltrimethylammonium chloride or hexadecyltrimethylammonium chloride; dialkyldimethylammonium salts such as dioctadecyldimethylammonium chloride, dihexadecyldimethylammonium chloride, or didodecyldimethylammonium chloride; and benzalkonium chlorides such as octadecyldimethylbenzylammonium chloride or hexadecyldimethylbenzylammonium chloride.

The amount of the emulsifying agent of component (D) generally is from 1 to 20 parts by weight per 100 parts by weight of the colloidal silica-silicone core shell material of component (A). The amount of less than 1 part by weight makes it difficult to form stable micelles, whereas exceeding 20 parts by weight results in an increase in viscosity of emulsions obtained, which makes the emulsions unstable similarly to above.

When the polyorganohydrogensiloxane of component (B) emulsified separately is mixed with component (A), nonionic emulsifying agent of component (D) may be simultaneously used. Use of the nonionic emulsifying agent is preferred for emulsifying component (B) alone. Examples of the nonionic emulsifying agent include glycerin fatty acid esters, sorbitan fatty acid esters, polyoxyethylene (hereinafter abbreviated as "POE") alkyl ethers, POE sorbitan fatty acid esters, POE glycerin fatty acid esters, POE alkyl phenol ethers, and POE polyoxypropylene block copolymers.

The amount of water of component (E) generally is in the range of 50 to 1000 parts by weight per 100 parts by weight of the core shell material of component (A). The amount of less than 50 parts by weight or exceeding 1000 parts by weight results in a poorly emulsified state, to produce unstable emulsions.

Processes for preparing the silicone aqueous emulsion composition according to the present invention are explained below.

To prepare-the silicone aqueous emulsion of the present invention, a mixture of colloidal silica of component (A)(a), a polyorganosiloxane of component (A)(b-1), an ethylenically unsaturated group-containing polyorganosiloxane (A) (b-2), and if necessary, an alkoxysilane of component (A) (b-3) or a mixture of component (A)(a), component (A)(b-2), and if necessary, component (A)(b-3), is subjected to polycondensation in an aqueous medium in the presence of an effective amount of an emulsifying agent or a mixture of emulsifying agents to prepare an emulsion of a colloidal silica-silicone core shell material. Subsequently, a polyorganohydrogensiloxane of component (B) and a curing catalyst of component (C) are added to the emulsion thus prepared (component (B) is added as such or as an aqueous emulsion prepared by mechanically emulsifying in the presence of an effective amount of an emulsifying agent or a mixture of emulsifying agents according to conventional procedure), and then mixed.

The colloidal silica of component (A)(a) used in the present invention means one which contains $SiO_2$ as a fundamental unit and is dispersed in water. The colloidal silica having an average particle size of from 4 to 300 nm, and preferably from 30 to 150 nm, is suitable in the present invention. Although such a colloidal silica includes both acidic and basic ones, use of the acidic colloidal silica is preferred, because the emulsion polymerization is carried out under acidic conditions by use of an anionic emulsifying agent.

The organosiloxane of component (A)(b-1) and the ethylenically unsaturated group-containing organosiloxane (A) (b-2) contain the respective structural units represented by formulae (III) and (IV) as described before. Those have no hydroxyl groups but have 1 to 10 silicon atoms, respectively. Although both the organosiloxanes may have straight-chain, branched, or cyclic structure and are not particularly limited, those of cyclic structure are preferred.

When the number of silicon atoms of these organosiloxanes exceeds 10, it becomes difficult to incorporate colloidal silica particles into siloxane micelles in emulsion polymerization, and consequently, free colloidal silica particles and free polyorganosiloxane micelles coexist with desired core shell material in emulsions thus formed. From this viewpoint, use of hydroxy group-containing siloxanes is not preferred, because such siloxanes undergo polycondensation in the initial emulsification to form siloxanes having 10 or more silicon atoms, introducing the problem described above.

Examples of the organosiloxane of component (A)(b-1) include cyclic compounds such as hexamethylcyclotrisiloxane, octamethylcyclotetrasiloxane, decamethylcyclopentasiloxane, 1,3,5,7-tetramethyl-1,3,5,7-tetraphenylcyclotetrasiloxane, 1,3,5,7-tetrabenzyltetjramethylcyclotetrasiloxane, and 1,3,5-tris(3,3,3-trifluoropropyl)trimethylcylcotetrasiloxane. They are used alone or as mixtures of two or more thereof.

Examples of the ethylenically unsaturated group-containing organosiloxane of component (A)(b-2) include cyclic compounds such as 1,3,5,7-tetravinyltetramethylcyclotetrasiloxane, octavinycyclotetrasiloxane, 1,3,5-trivinyltrimethylcyclotrisiloxane, 1,3,5,7-tetraallytetramethylcyclotetrasiloxane, 1,3,5 ,7-tetra(5-hexenyl)-tetramethylcyclotetrasiloxane, 1,3,5,7-tetra(7-octenyl)-tetramethylcyclotetrasiloxane, 1,3,5,7-tetra (vinyloxypropyl)-tetramethylcyclotetrasiloxane, 1,3,5,7-tetra-(vinyloxyethoxypropyl)tetramethylcyclotetrasiloxane, 1,3,5,7-tetra(p-vinylphenyl)tetramethylcyclotetrasiloxane, 1,3,5,7-tetra[1-(m-vinylphenyl)methyl] tetramethylcyclotetrasiloxane, 1,3,5,7-tetra[2-(p-vinylphenyl)ethyl)]tetramethylcyclotetrasiloxane, 1,3,5,7-tetra[3-(p-vinylphenoxy)propyl] tetramethylcyclotetrasiloxane, 1,3,5,7-tetra[3-(p-vinylbenzoyloxy)-propyl]tetramethylcyclotetrasiloxane, 1,3,5,7-tetra[3-(p-isopropenylbenzoylamino)propyl] tetramethylcyclotetrasiloxane, 1,3,5,7-tetra(γ-acryloxypropyl)tetramethylcyclotetrasiloxane, 1,3,5,7-tetra (γ-methacryloxypropyl)tetramethylcyclotetrasiloxane, 1,3, 5,7-tetra(N-methacryloyl-N-methyl-γ-aminopropyl) tetramethylcyclotetrasiloxane, 1,3,5,7-tetra(N-acryloyl-N-methyl-γ-aminopropyl)tetramethylcyclotetrasiloxane, 1,3,5, 7-tetra[N,N-bis(methacryloyl)-γ-aminopropyl]-tetramethylcyclotetrasiloxane, and 1,3,5,7-tetra[N,N-bis (acryloyl)-γ-aminopropyl]tetramethylcyclotetrasiloxane. These are used alone or as mixtures of two or more kinds thereof.

In addition to the cyclic compounds exemplified above, organosiloxanes of straight-chain or branched structure may be used. In these organosiloxanes, it is preferred that the ends of these molecules are blocked with organic groups other than a hydroxyl group, for example, an alkoxy group, a trimethylsilyl group, a dimethylvinylsilyl group, a methylphenylvinylsilyl group, a methyldiphenylsilyl group, or a 3,3,3-trifluoropropyldimethylsilyl group.

Although the alkoxysilane of component (A)(b-3) which is used if necessary is a component for forming a shell portion, it also effectively mediates the interfacial bonding between the core of colloidal silica and the shell of the polyorganosiloxane.

Examples of such organic silane compound having 1 to 4 alkoxy groups include vinyltrimethoxysilane, vinyltriethoxysilane, vinyltripropoxysilane, vinyltributoxysilane, vinyltri(methoxyethoxy)silane, γ-methacryloxyethyltrimethoxysilane, γ-methacryloxyethyltriethoxysilane, γ-acryloxyethyltrimethoxysilane, γ-acryloxyethyltriethoxy-silane, γ-methacryloxypropyltrimethoxysilane, γ-methacryloxypropyl-triethoxysilane, γ-acryloxypropyltrimethoxysilane, γ-acryloxypropyltriethoxysilane, dimethylvinylmethoxysilane, dimethylvinylethoxysilone, methylvinyldimethoxysilane, methylvinyldiethoxysilane, tetramethoxysilane, tetraethoxysilane, tetrapropoxysilane, tetrabutoxysilane, methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, propyltrimethoxysilane, propyltriethoxysilane, propyltripropoxysilane, propyltributoxysilane, dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, methylethyldimethoxysilane, methylpropyldiethoxysilane, diphenyldimethoxysilane, diphenyldiethoxysilane, phenyltrimethoxysilane, phenyltriethoxysilane, γ-glycidoxypropyltrimethoxysilane, γ-glycidoxypropylmethyldimethoxysilane, and fluorinated alkoxysilanes such as fluoroalkylalkoxysilanes.

As described above, the organosiloxane of component (A)(b-1), the ethylenically unsaturated group-containing organosiloxane of component (A)(b-2), and the alkoxysilane of component (A)(b-3) are added to the emulsion composition so that the polyorganosiloxane forming the shell portion in the colloidal silica-silicone core shell material forms 20 to 95% by weight and, in addition, satisfies the average compositional formula (I):

$$R^1_a SiO_{(4-a)/2} \qquad (I)$$

wherein $R^1$ is a substituted or unsubstituted monovalent hydrocarbon group having 1 to 8 carbon atoms, and groups containing ethylenically unsaturated groups form 0.01 to 25 mol % of $R^1$; and a is a number of 1.80 to 2.20.

In the present invention, to improve the adhesive properties (adhesion or fixing) of the emulsion composition to air bag base cloth, an organic silicon compound which contains both an alkoxy group and a carbofunctional group comprising carbon atoms, hydrogen atoms, and at least one atom selected from a nitrogen atom and an oxygen atom can also be added as component (A)(b-3) to the emulsion composition.

Examples of such an organic silicon compound include 3-aminopropyl-methyldimethoxysilane, N-(2-aminoethyl)-3-aminopropyl-triethoxysilane, N-triethylenediaminepropylmethyldimethoxy-silane, 3-glycidoxypropylmethyldiethoxysilane, and 3,4-epoxycylcohexylethyltrimethoxysilane. The amount of the organic silicon compound used is usually 20% by weight or less, and preferably 10% by weight or less, based on the total amount of components (A)(b-1) and (A)(b-2).

As described above, in the silicone emulsion composition according to the present invention, a mixture of colloidal silica of component (A)(a), an organosiloxane of component (A)(b-1), an ethylenically unsaturated group-containing organosiloxane of component (A)(b-2), and if necesary, an alkoxysilane of component (A)(b-3) or a mixture of components (A)(a),. (A)(b-2), and (A)(b-3), is sheared and mixed in an aqueous medium in the presence of an emulsifying agent using a homogenizer, and is subjected to polycondensation to prepare a colloidal silica-silicone core shell material.

The emulsifying agent used herein has the function of a surfactant to emulsify mainly components (A)(b-1) and (A)(b-2) and colloidal silica-silicone core shell material formed, and simultaneously, acts as a catalyst for the polycondensation reaction of component (A)(a) with components (A)(b-1), (A)(b-2), and (A)(b-3). For this purpose, organic sulfonic acid-based emulsifying agents are preferably used as anionic emulsifying agents, and quaternary ammonium salt-type emulsifying agents are preferably used as cationic emulsifying agents. However, some quaternary ammonium salt type emulsifying agents have only low catalytic action, and in such a case, simultaneous use of an alkali catalyst such as sodium hydroxide or potassium hydroxide is preferred.

The amount of the emulsifying agent used is usually from about 1 to about 20 parts by weight, and preferably from about 1 to about 10 parts by weight, per 100 parts by weight of the total amount of component (A)(a) and components (A)(b-1), (A)(b-2), and (A)(b-3). Nonionic emulsifying agents also may be used if necessary together with these emulsifying agents.

In the preparation of the colloidal silica-silicone core shell material, a combination of acidic colloidal silica with anionic emulsifying agents or a combination of alkaline colloidal silica with a cationic emulsifying agents must be selected to keep the colloidal silica stable.

In these cases, the amount of water usually ranges from 50 to 1000 parts by weight, and preferably from 100 to 500 parts by weight, per 100 parts by weight of the total amount of component (A)(a) and components (A)(b-1), (A)(b-2), and (A)(b-3). The condensation temperature usually ranges from 5 to 100° C.

In the preparation of the colloidal silica-silicone core shell material in the compositions according to the present invention, a crosslinking agent can also be used as a fourth component to improve strength of the silicone shell portion. Example of the crosslinking agent include trifunctional crosslinking agents such as trimethoxysilane, methyltrimethoxysilane, vinyltrimethoxysilane, methyltriethoxysilane, phenyltrimethoxysilane, ethyltriethoxysilane, or (3,3,3-trifluoropropyl) trimethoxysilane; and tetrafunctional crosslinking agents such as tetraethoxysilane. The amount of the crosslinking agent used is usually from 10% by weight or less, and preferably 5% by weight or less, based on the total amount of components (A)(b-1), (A)(b-2), and (A)(b-3).

The colloidal silica-silicone core shell material in the composition according to the present invention is either acidic or alkaline, and therefore, is required to neutralize with an alkalis or an acid to keep the same stable over a long period of time. Example of the alkali used for this purpose include sodium hydroxide, potassium hydroxide, sodium carbonate, sodium hydrogencarbonate, and triethanolamine. Examples of the acid used include hydrochloric acid, sulfuric acid, nitric acid, acetic acid, and oxalic acid.

The organohydrogensiloxane of component (B) used in the present invention is not particularly limited in molecular structure as long as they have 2 or more structural units each represented by formula (II) as shown before. Although the organohydrogensiloxane having a straight-chain, cyclic, or branched siloxane skeleton can be used, those of a straight-chain skeleton or a branched skeleton comprising an $R^2{}_2HSiO_{1/2}$ unit and a $SiO_2$ unit are preferred in view of easiness of preparation thereof.

Component (B) may be added as such to the emulsion of component (A). However, component (B) can also be sheared and mixed in an aqueous medium in the presence of an emulsifying agent using a homogenizer beforehand, if necessary, to form an aqueous emulsion of component (B), which is then mixed with the emulsion of component (A). The emulsifying agent used for this purpose mainly acts as a surfactant to emulsify component (B). Nonionic emulsifying agents are preferably used, because anionic emulsifying agents must be finally neutralized. Although the nonionic emulsifying agents as exemplified above can be used, POE alkylphenol ethers are preferred among those emulsifying agents. The emulsifying agents and water are used in the respective amounts such that the amounts obtained by adding amounts used for component (A) fall in the ranges specified before. The amount of the emulsifying agents is preferably from 1 to 10 parts by weight and the amount of water is preferably from 100 to 500 parts by weight, per 100 parts by weight of component (B). The emulsification temperature usually ranges from 5 to 100° C.

The respective necessary amounts of component (B) which may be used as such or as an emulsion and a curing catalyst of component (C) are added to the emulsion of component (A) described above, and then mixed with stirring, thus accomplishing the preparation of silicone aqueous emulsion composition of the present invention. The curing agent used in the present invention is preferably platinum-based compounds, and platinum catalysis inhibitors may also be together, if necessary. It is preferred to prepare an O/W or W/O emulsion by using the emulsifying agent and water according to conventional procedure prior to use of the curing agent and the catalysis inhibitor. Addition of the curing catalyst and mixing with stirring are preferably carried out in the temperature range of 5 to 25° C.

The silicone aqueous emulsion according to the present invention are maintained stable over a period of 2 months after preparation thereof. However, when the emulsion must be stored for a still longer period of time, it is preferred that the curing catalyst is separately stored and added to the emulsion immediately before using the same.

Concurrent use of fillers for reinforcement, stabilizers, pigments, modifiers, or fire retardants can be made without any problem. Addition of a thickening agent or dilution with water can also be freely carried out for viscosity suitable for coating.

Examples of the fire retardant include aluminum hydroxide, magnesium hydroxide, and zinc carbonate.

To improve adhesive properties of the emulsion composition of the present invention to air bag base cloth, conventional bonding aids such as an organic silicon compound containing both a carbofunctional group and a hydrolyzed group in molecules can be added to the emulsion composition. Examples of such an organic silicon compounds include 3-glycidoxypropyltrimethoxysilane, 3-aminopropyltrimethoxysilane, N-(2-aminoethyl)-3-aminopropyltrimethoxysilane, 3,4-epoxycyclohexylethyltrimethoxysilane, 3-mercaptopropyltrimethoxysilane, 3-chloropropyltrimethoxysilane, and an organic silicon compound represented by the following formula:

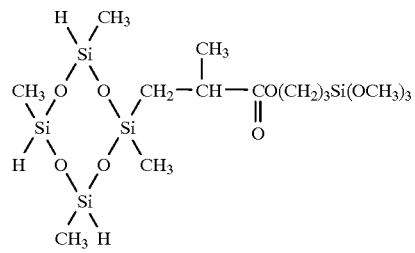

These organic silicon compounds can be used alone or as mixtures of two or more thereof.

The emulsion composition of the present invention is applied to a variety of air bag base cloth according to various methods such as dip coating, spray coating, brush coating, knife coating, or roll coating, dried to remove water, and is allowed to stand at room temperature for 10 minutes to several hours or somewhat heated according to the air bag base cloth, to cure the coating.

When the film-formable emulsion type silicone composition for air bags of the present invention is applied to a variety of air bag base cloth, working efficiency in coating is improved, because the emulsion composition (coating solution) can be readily adjusted to lower viscosity, compared with conventional silicone rubber coating compositions. In addition, a rubber film is formed in the form corresponding to surface form of the base cloth, even if the surface has a complicated form, by gradually evaporating water to prevent rubber surfaces from blocking caused by the contact of the rubber surfaces each other. Further, the emulsion composition forms a cured film having excellent mechanical strength, compared with conventional film-formable emulsions.

Furthermore, the emulsion type silicone composition of the present invention, in which toxic organic solvents are not used, provides an excellent safe working atmosphere, prevents workers from health hazards, and can be adjusted to viscosity suitable for various coating methods.

The present invention is described below in more detail by reference to the following examples and comparative examples. Unless otherwise indicated, all parts and percents are by weight.

PREPARATION EXAMPLE 1

210 Parts of octamethylcyclotetrasiloxane and 1.2 parts of 1,3,5,7-tetravinyltetramethylcyclotetrasiloxane were added to a mixture of 1,000 parts of an acidic colloidal silica, Snowtex OL (manufactured by Nissan Chemical Industries, Ltd., average particle size: 84 nm, $SiO_2$: 20.66%, $Na_2O$: 0.019%, pH: 2.78), 470 parts of distilled water, and 8.4 parts of dodecylbenzenesulfonic acid. The resulting mixture was preliminarily stirred with a homomixer and passed through a homogenizer twice at a pressure of 300 kgf/cm² to conduct emulsification and dispersion.

The mixture thus prepared was placed in a separable flask equipped with a condenser, an inlet for nitrogen, and a stirrer. The contents were heated at 85° C. for 5 hours with stirring, and cooled to 5° C. for 48 hours to complete polymerization. Subsequently, the polyorganosiloxane emulsion thus prepared was neutralized to pH 7 with an aqueous sodium carbonate solution to terminate the polymerization. The conversion of octamethylcylcotetrasiloxane and 1,3,5,7-tetravinyl-tetramethylcylcotetrasiloxane into the polyorganosiloxane obtained was 99.4%.

Results of particle size analysis by a dynamic light-scattering method and of observation under an electron microscope revealed that the polyorganosiloxane prepared above was a colloidal silica-silicone core shell material. That is, in the particle size analysis with a laser particle size analysis system (LPA-3000 S/3100, manufactured by Otsuka Denshi Co., Ltd. ), a peak at about 84 nm assigned to monodisperse particle distribution of the starting colloidal silica completely disappeared, whereas a peak at about 153 nm indicating monodisperse particle distribution newly appeared. In the observation under the electron microscope, only silicone particle images were confirmed and starting silica particle images were not observed at all.

On the other hand, part of the core shell material emulsion was poured into a large amount of acetone to precipitate the core shell material. The material precipitated was separated by filtration and dried at 50° C. for 12 hours in a vacuum drier to obtain an aggregate of the core shell material. Results of elementary analysis and IR and $^1$H and $^{29}$Si-NMR analyses indicated that the proportion of the silicone forming shell portions in the aggregate was 49.7%. When the core, shell material was regarded as a graft polymer, the graft percentage and graft efficiency thereof were 41.7%, respectively. This was used as a main component.

100 Parts of a polymethylhydrogensiloxane with a viscosity of 25 cSt represented by the formula given below was added to a mixture of 2.0 parts of polyoxyethylene(18)-nonylphenyl ether (manufactured by Nikko Chemicals Co., Ltd., NIKKOL NP-18TX: HLB 19) and 320 parts of distilled water, and the resulting mixture was preliminarily stirred with a homomixer and passed through a homogenizer twice at a pressure of 300 kgf/cm² to conduct emulsification and dispersion, thus preparing a curing agent.

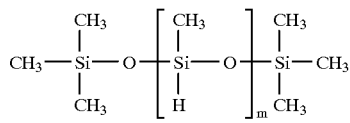

Subsequently, the curing agent (solid content: 24%) in the respective amounts of 0.001 part (corresponding the additional amount that the number of the hydrogen atoms directly bonded to the silicon atoms per ethylenically unsaturated group is 0.005), 0.40 part (the number: 2), and 30 parts (the number: 150), an O/W emulsion of a chloroplatinic acid-olefin complex salt (platinum content: 3%) in an amount of 0.05 part, a thickening agent HPC (hydroxypropyl cellulose, grade M, manufactured by Nippon Soda Co., Ltd.) in an amount of 1.0 part, and 3-glycidoxypropyltrimethoxysilaneiin an amount of 1.2 parts were added to 100 parts of the main component (solid content: 24%) prepared above at 25° C., and mixed with stirring to prepare silicone aqueous emulsion compositions (preparation solutions 1 to 3), respectively.

PREPARATION EXAMPLE 2

A polyorganosiloxane emulsion was prepared under the same composition and conditions as in Preparation Example 1, except that Snowtex OZL (manufactured by Nissan Chemical Industries, Ltd. average particle size: 122 nm, SiO$_2$: 21.24%, Na$_2$O: 0.101%, pH: 2.02) was used as an acidic colloidal silica. Results of particle size analysis by a dynamic light-scattering method and of observation under an electron microscope revealed that the polyorganosiloxane obtained was a colloidal silica-silicone core shell material with monodisperse particle distribution (the proportion of silicone shell portion: 49.3%, graft percentage and graft efficiency: 40.3%, respectively). This was used as a main component.

100 Parts of a polymethylhydrogensiloxane with a viscosity of 10 cSt represented by the formula given below was added to a mixture of 2.0 parts of the same polyoxyethylene (18)-nonylphenyl ether as in Preparation Example 1 and 320 parts of distilled water, and the resulting mixture was preliminarily stirred with a homomixer and then passed through a homogenizer twice at a pressure of 300 kgf/cm² to conduct emulsification and dispersion, thus preparing a curing agent.

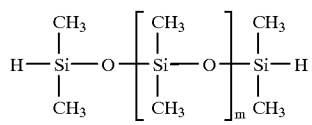

Subsequently, the curing agent (solid content: 24%) in the respective amounts of 0.015 part (corresponding to the additiona amount that the number of the hydrogen atoms directly bonded to the silicon atoms per ethylenically unsaturated group is 0.005) and 28.3 parts (the number: 10), an O/W emulsion of a chloroplatinic acid-olefin complex salt (platinum content: 3% by weight) in an amount of 0.07 part, a thickening agent HPC (grade M) in an amount of 1.1 parts, and an organic silicon compound represented by the formula shown below in an amount of 1.5 parts were added to 100 parts of the main component (solid content: 24%) prepared above and then mixed with stirring to prepare silicone aqueous emulsion compositions (preparation solutions 4 and 5), respectively.

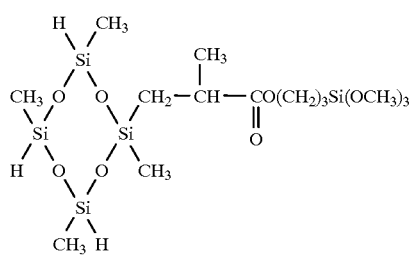

PREPARATION EXAMPLE 3

100 Parts of octamethylcylcotetrasiloxane was added to a mixture of 2.0 parts of dodecylbenzenesulfonic acid and 320 parts of distilled water, and the resulting mixture was preliminarily stirred with a homomixer and then passed through a homogenizer twice at a pressure of 300 kgf/cm² to conduct emulsification and dispersion.

The emulsified dispersion thus prepared was placed in a separable flask equipped with a condenser, an inlet for nitrogen, and a stirrer. The contents were heated with stirring at 85° C. for 5 hours, cooled at 5° C. for 48 hours, and then neutralized to pH 7 with a 10% aqueous solution of sodium carbonate to terminate condensation. This was used as a main component.

A result of GPC measurement indicated that the condensation product had a number average molecular weight (Mn) of $2.93 \times 10^5$.

Subsequently, 5 parts of the curing agent prepared in Preparation Example 1, 0.1 part of a 50% aqueous emulsion of dibutyltin dilaurate (prepared from 50 parts of dibutyltin dilaurate, 5 parts of sodium dodecylbenzenesulfonate, and 45 parts of distilled water), 3.0 parts of 3-glycidoxypropyltrimethoxysilane, and 4 parts of a thickening agent HPC (hydroxypropyl cellulose, grade M, manufactured by Nippon Soda Co., Ltd.) were added to 100 parts of the main agent prepared above and mixed with stirring to prepare a silicone aqueous emulsion composition (preparation solution 6).

PREPARATION EXAMPLE 4

15 Parts of fumed silica was uniformly mixed with 100 parts of a α,ω-divinylpolymethylsiloxane base polymer with a viscosity of $1 \times 10^4$ cP, and subsequently, a 2-propanol solution of chloroplatinic acid was uniformly dispersed into the mixture in an amount of 20 ppm based on the base polymer in terms of platinum, thereby preparing a main component.

On the other hand, 15 parts of fumed silica was uniformly mixed with 100 parts of a α,ω-divinylpolymethyl-siloxane base polymer with a viscosity of $1 \times 10^4$ cP, and subsequently, 5.0 parts of a polymethylhydrogensiloxane with a viscosity of 25 cSt represented by the following formula:

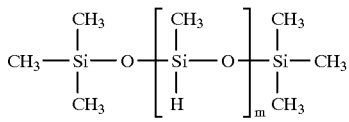

and 0.2 part of a silicon compound containing acetylenically unsaturated groups represented by the following formula:

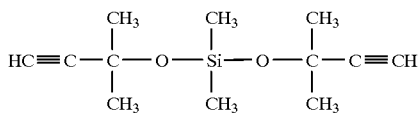

were uniformly dispersed into the above mixture to prepare a curing agent.

The respective 50 parts of the main component and the curing agent and 3 parts of an organic silicon compound represented by the following formula:

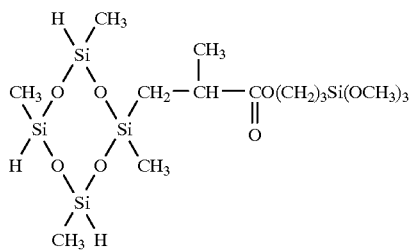

were mixed with stirring to prepare rubber component 7.

EXAMPLES 1 AND 2 AND COMPARATIVE EXAMPLES 1 TO 4

The respective diluting agents shown in Table 1 in the respective amounts shown in Table 1 were added to preparation solutions 1 to 6 and rubber component 7 which were prepared in Preparation Examples 1 to 4 to prepare coating compositions. The coating compositions were coated on 6,6-nylon cloth (420D) such that the amount of rubber was from 60 to 80 grams/m². Subsequently, the coated cloth was heated at 90° C. for 5 minutes and then at 170° C. for 2 minutes in an oven to form a silicone rubber cured film on the cloth.

Surface conditions of the rubber coating film on the cloth was visually observed to evaluate according to the following standards, and the surface dynamic coefficient of friction (rubber-rubber, rubber-SUS) was measured under the following conditions.

[Standards for Evaluation of Surface Conditions of Coating Film]

Film Thickness

⊚: Uniform

○: Almost uniform

Δ: Somewhat uneven x: Uneven

[Measurement Conditions of Surface Dynamic Coefficient of Friction]

Load: 150 grams

Rate: 100 mm/min

Temperature: 25° C.

Humidity: 60% RH

[Coating Properties]

When the rubber coating composition was applied to 6,6-nylon cloth, easiness of coating and spreading of the respective compositions was observed to evaluate according to four levels shown below.

⊚: Easily spread and smoothly applied

○: Easily applied

Δ: Somewhat hard to apply x: Hard to apply

[Permeability]

Similar to the evaluation of the coating properties, when the coating composition was applied to 6,6-nylon cloth, easiness of permeating.,the composition into the cloth was observed to evaluate according to four levels shown below.

⊚: Permeate easily and uniformly from the surface into the inside of the entire cloth ○: Somewhat difficult to permeate, but uniformly permeate from the surface into the inside of the cloth Δ: A large amount of the composition remains on the surface portion of the cloth and the composition fails to sufficiently permeate into the inside of the cloth x: The compostion remains only on the surface portion of the cloth and fails to permeate into the inside of the cloth

[Adhesive properties and Mechanical Strength]

Adhesive properties of the rubber film to 6,6-nylon cloth and mechanical strength were observed to evaluate according to three levels given below (When the nylon cloth coated is rubbed between one's fingers, peeling or falling occurs from a rubber film, showing poor adhesive properties or mechanical strength).

⊚: Falling of rubber film from the coating surface is not observed to exhibit excellent adhesive properties and mechanical strength Δ: Falling of rubber film from the coating surface is slightly observed, and peeling develops x: Falling of rubber film from the coating surface occurs.

TABLE 1

| Prepared Solutions or Rubber Component | Diluting Agents | Surface Conditions | Surface Dynamic Coefficients of friction | |
|---|---|---|---|---|
| | | | Rubber-Rubber | Rubber-SUS |
| Example | | | | |
| 1 | 2 | — | ◎ | 0.83 | 0.58 |
| 2 | 5 | — | ◎ | 0.90 | 0.64 |
| Comparative Example | | | | |
| 1 | 1 | — | ◎ | 0.87 | 0.61 |
| 2 | 3 | — | ◎ | 0.88 | 0.61 |
| 3 | 4 | — | ◎ | 0.92 | 0.65 |
| 4 | 6 | — | ◎ | 1.00 | 0.68 |
| 5 | 7 | — | x | 2.00 | 1.67 |
| 6 | 7 | Toluene | x | *1 | *1 |
| 7 | 7 | Xylene | x | *1 | *1 |

| | Coating Properties | Permeability | Adhesive properties and Mechanical Strength |
|---|---|---|---|
| Example | | | |
| 1 | ◎ | ◎ | ◎ |
| 2 | ◎ | ◎ | ◎ |
| Comparative Example | | | |
| 1 | ◎ | ◎ | x |
| 2 | ◎ | ◎ | x |
| 3 | ◎ | ◎ | x |
| 4 | ◎ | ◎ | Δ |
| 5 | x | x | ◎ |
| 6 | ○ | ◎ | ◎ |
| 7 | ○ | ◎ | ◎ |

*1 Ununiform films are formed to exhibit large variations in measurements. Accurate determination is impossible. In Comparative Examples 6 and 7, the diluting agents were added so that solid contents were 24%, respectively.

What is claimed is:

1. A film-formable emulsion type silicone composition for an air bag, which comprises:

(A) 100 parts by weight of a colloidal silicasilicone core shell material comprising:
(a) 80% to 5% by weight of a core comprising colloidal silica, and
(b) 20% to 95% by weight of a shell comprising a polyorganosiloxane represented by the following average compositional formula:

$$R^1_a SiO_{(4-a)/2} \quad (I)$$

wherein $R^1$ is a substituted or unsubstituted monovalent hydrocarbon group having 1 to 8 carbon atoms; a is a number of 1.80 to 2.20; and 0.01 to 25 mol % of $R^1$ are groups containing ethylenically unsaturated groups, (B) a polyorganohydrogensiloxane containing at least two units each represented by the following general formula:

$$R^2_b H_c SiO_{[4-(b+c)]/2} \quad (II)$$

wherein $R^2$'s may be the same or different and each represent a substituted or unsubstituted monovalent hydrocarbon group containing no ethylenically unsaturated groups; and b represents an integer of 0 to 2, c an integer of 1 or 2, and b+c is an integer of 1 to 3, the amount of the polyorganohydrogensiloxane being such that the number of hydrogen atoms bonded to silicon atoms is from 0.01 to 100 per ethylenically saturated group of component (A), (C) $1\times10^{-6}$ to 1 part by weight of a curing catalyst, (D) 1 to 20 parts by weight of an emulsifying agent, and (E) 50 to 1,000 parts by weight of water.

2. An air bag prepared by sewing sheets of air bag base cloth having formed thereon a cured film of the emulsion type silicone composition as claimed in claim 1.

3. The film-formable emulsion type silicone composition for an air bag as claimed in claim 1, wherein the content of the groups containing ethylenically unsaturated groups is 0.05 to 5 mol %.

4. The film-formable emulsion type silicone composition for an air bag as claimed in claim 1, wherein said component (A)(b) comprises, as another monovalent organic group, organic functional group represented by the following formulae:

— $CH_2CH_2CH_2NH_2$

— $CH_2CH_2CH_2NHCH_2CH_2NH_2$

— $CH_2CH_2CH_2NHCH_2CH_2NHCH_2CH_2NH_2$

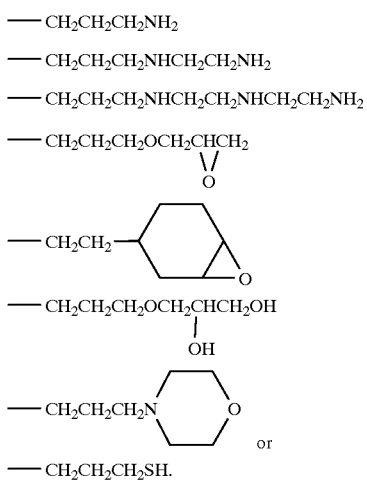

— $CH_2CH_2CH_2SH$.

5. The film-formable emulsion type silicone composition for an air bag as claimed in claim 1, wherein said emulsifying agent (d) is an anionic or cationic emulsifying agent.

* * * * *